United States Patent
Yamazaki et al.

(10) Patent No.: US 7,129,441 B2
(45) Date of Patent: *Oct. 31, 2006

(54) NOZZLE CHANGE MAGAZINE FOR LASER BEAM MACHINE

(75) Inventors: Tsunehiko Yamazaki, Niwa gun (JP); Naoomi Miyakawa, Niwa gun (JP)

(73) Assignee: Yamazaki Mazak Corporation, Aichi Pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/121,429

(22) Filed: May 4, 2005

(65) Prior Publication Data

US 2005/0263508 A1  Dec. 1, 2005

(30) Foreign Application Priority Data

May 26, 2004  (JP) .............................. 2004-155921

(51) Int. Cl.
*B23K 26/00* (2006.01)
*B23K 26/14* (2006.01)

(52) U.S. Cl. .............................. 219/121.78; 219/121.84

(58) Field of Classification Search ........... 219/121.84, 219/121.78; 483/3, 7, 16, 32
See application file for complete search history.

(56) References Cited

U.S. PATENT DOCUMENTS

| | | | | |
|---|---|---|---|---|
| 5,854,460 A | * | 12/1998 | Graf et al. ............. | 219/121.67 |
| 6,723,947 B1 | * | 4/2004 | Inoue et al. ........... | 219/121.78 |
| 2005/0263509 A1 | * | 12/2005 | Yamazaki et al. ..... | 219/121.84 |
| 2005/0266974 A1 | * | 12/2005 | Yamazaki et al. ............ | 483/16 |

FOREIGN PATENT DOCUMENTS

| | | | | |
|---|---|---|---|---|
| JP | 62-254993 A | * | 11/1987 | |
| JP | 4-55082 A | * | 2/1992 | |
| JP | 4-309487 A | * | 11/1992 | |
| JP | 06-023580 | | 2/1994 | |
| JP | 7-185865 A | * | 7/1995 | |
| JP | 10-6062 A | * | 1/1998 | |

* cited by examiner

*Primary Examiner*—Geoffrey S. Evans
(74) *Attorney, Agent, or Firm*—Renner, Otto, Boisselle & Sklar, LLP

(57) ABSTRACT

A nozzle change magazine for laser beam machine which improves machining efficiency of a laser beam machine by installing a nozzle change magazine for laser machining tools equipped with a torch and a nozzle replaceably attached to the tip of the torch. A setup station for laser machining tools is installed outside a machining area of a laser beam machine. It includes a nozzle station which replaces a nozzle at the tip of the torch. The nozzle change station has a large number of magazines and changes the nozzle at the tip of the laser machining tool.

8 Claims, 18 Drawing Sheets

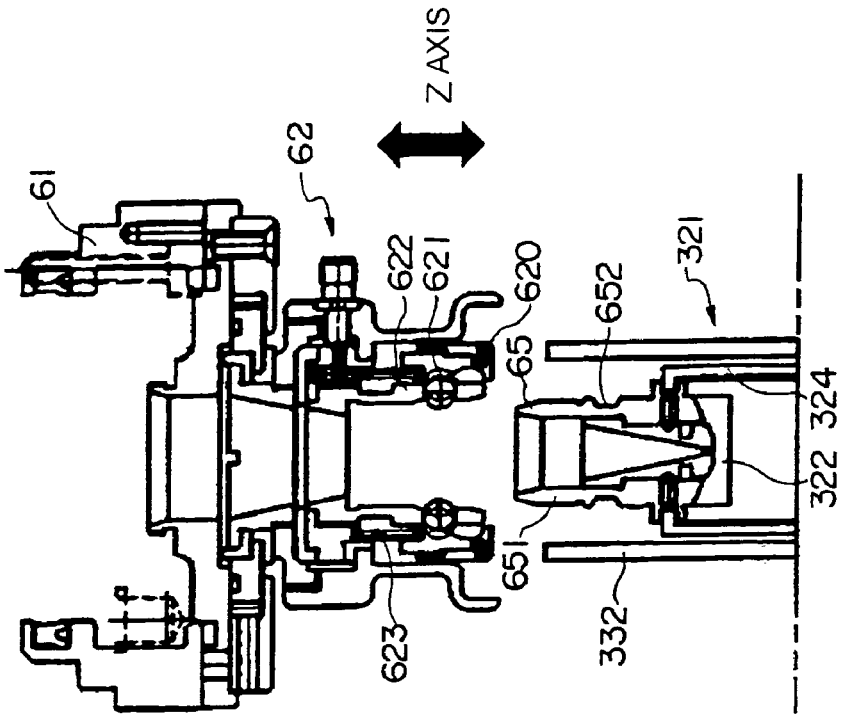
FIG.11(a) MOUNTED NOZZLE
FIG.11(b) REMOVED NOZZLE

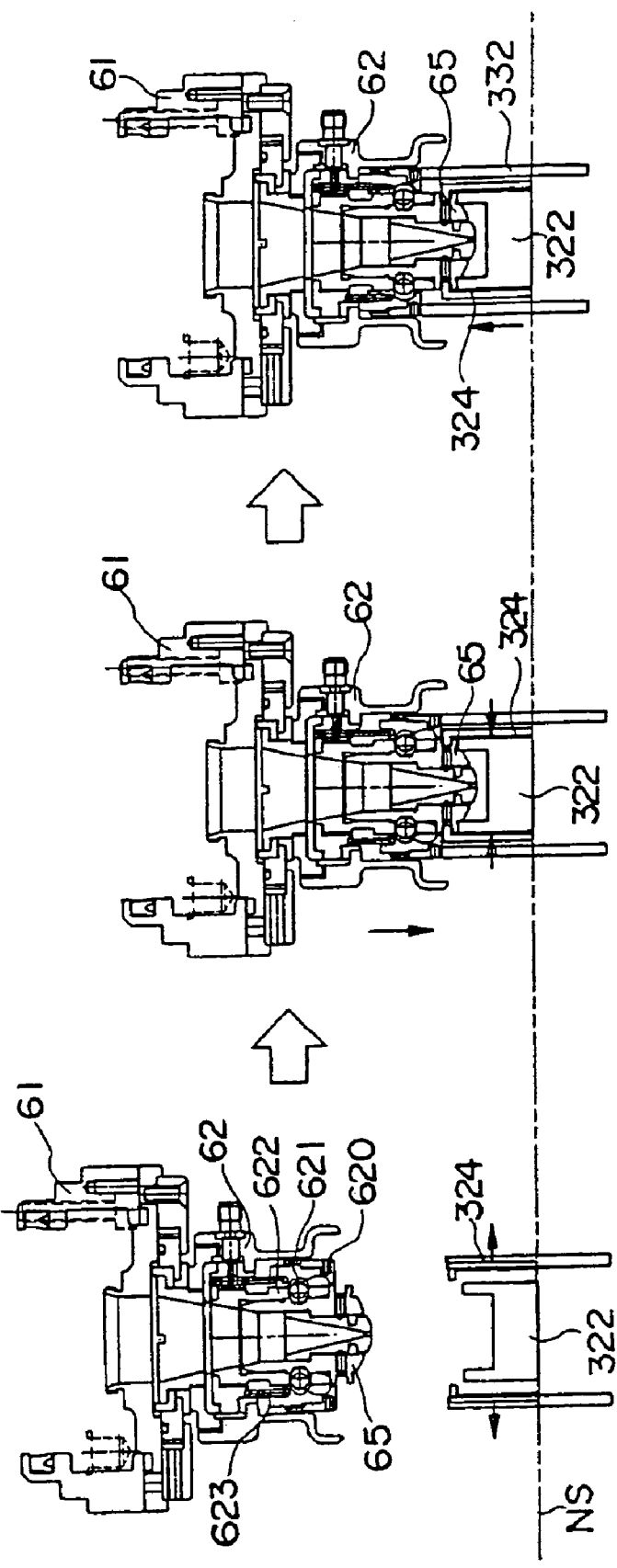

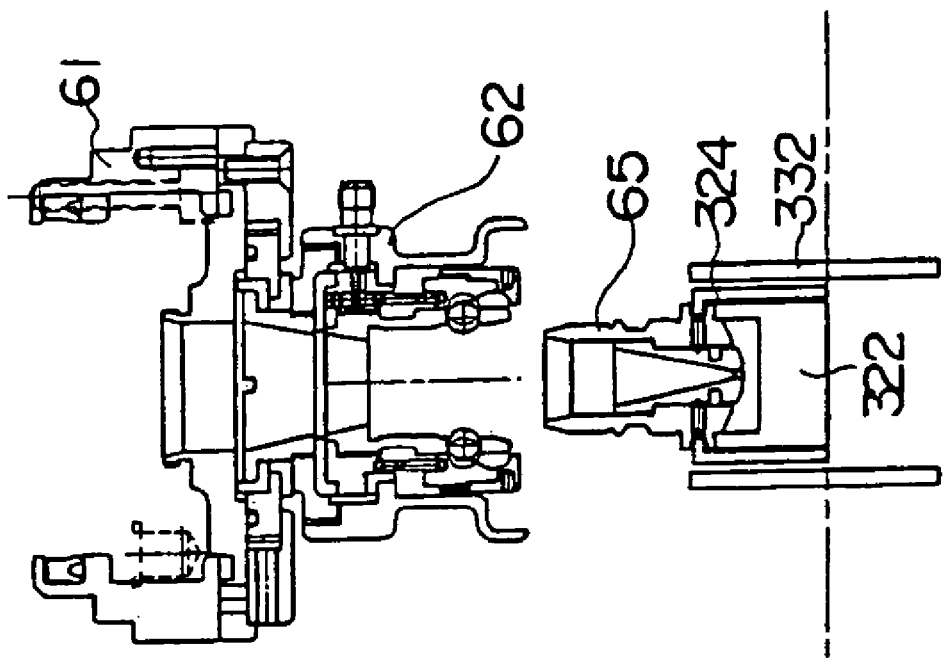
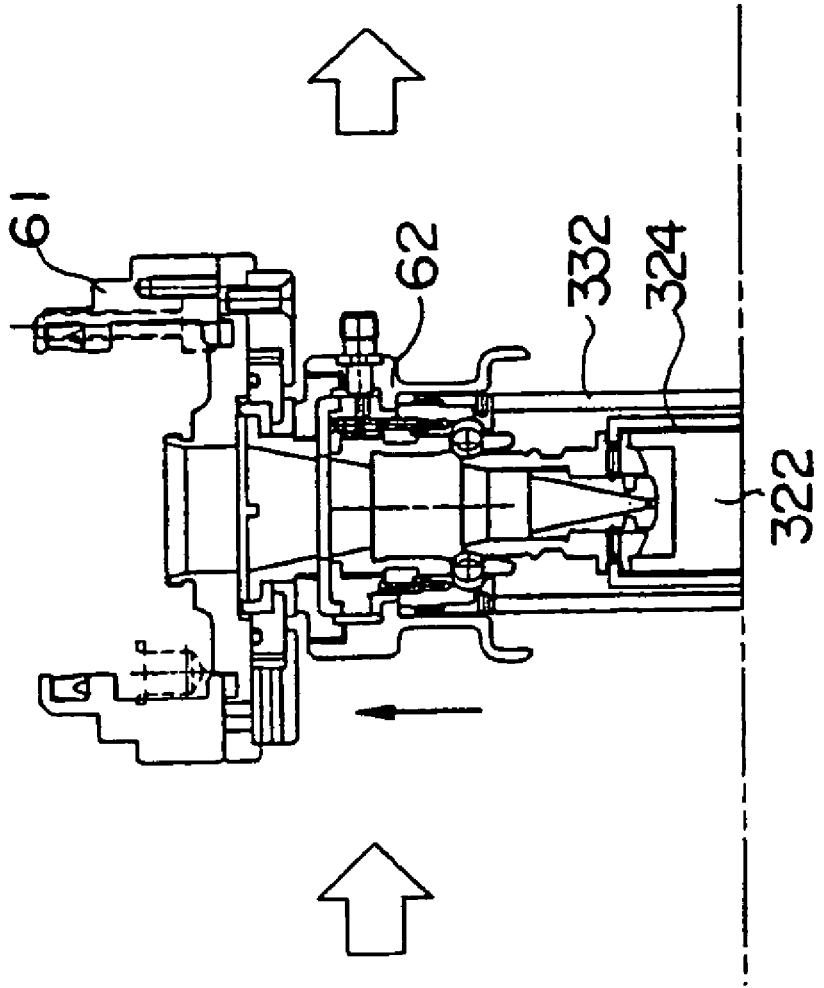
FIG.12-2(d)
FIG.12-2(e)

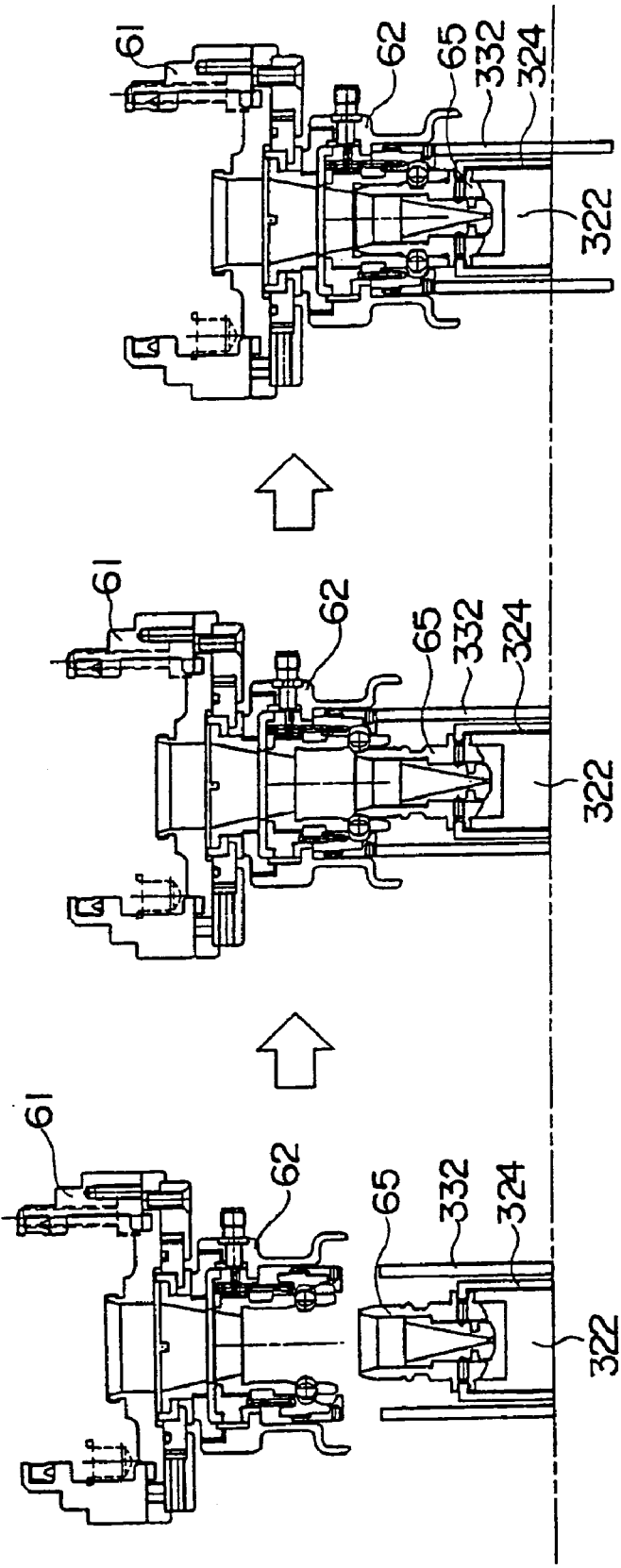

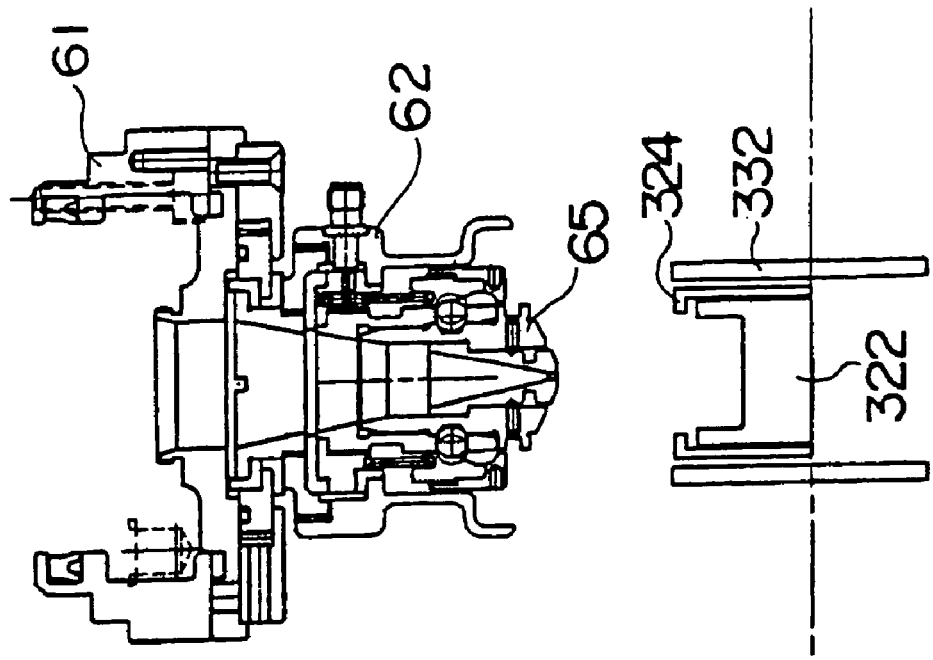
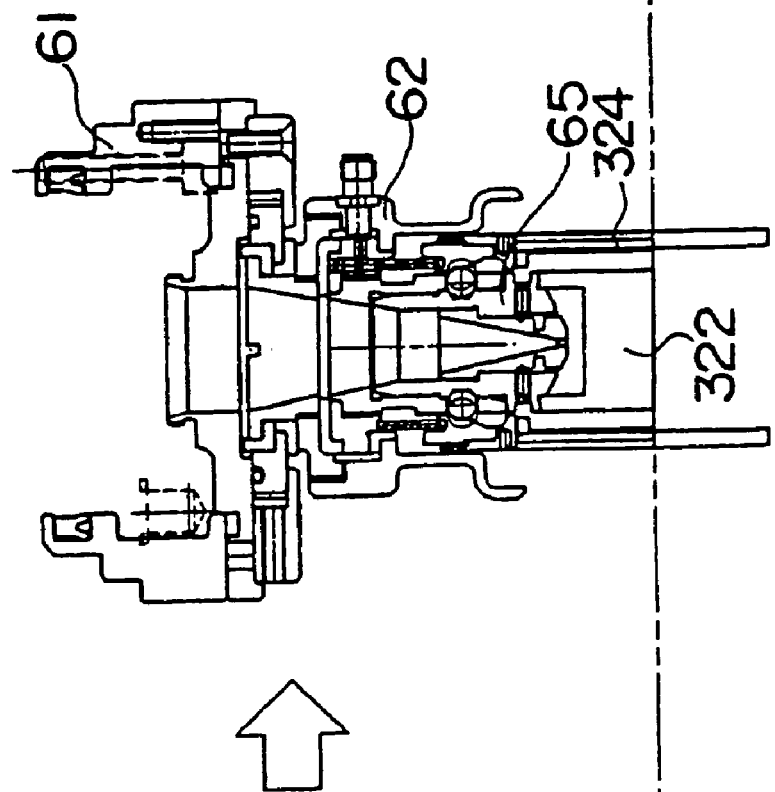
FIG.14-2(d)
FIG.14-2(e)

NOZZLE CHANGE MAGAZINE FOR LASER BEAM MACHINE

The present application is based on and claims priority of Japanese patent application No. 2004-155921 filed on May 26, 2004, the entire contents of which are hereby incorporated by reference.

BACKGROUND OF THE INVENTION

1. Field of the Invention

The present invention relates to a nozzle change magazine which makes it possible to use unskilled operators in operating a laser beam machine, maximize machining quality and productivity for each material and workpiece thickness, and accomplish long, unattended operation.

2. Description of the Related Art

There are known laser beam machines capable of changing a nozzle automatically (see, for example, Japanese Patent Laid-Open Publication No. 6-23580 (Patent Document 1)). With such a laser beam machine, the nozzle is changed on a table and can be indexed using power of X-axis and Y-axis tables.

With the nozzle change mechanism described above, since the nozzle is attached and detached by being screwed in and out, if the nozzle is misaligned mechanically with a nozzle holder due to adhesion of dust or the like, the number of turns of the screw may deviate, preventing the nozzle to be screwed fully into the nozzle holder, and thus making it impossible to check whether the torch is clamped or unclamped, which may cause an accident.

Also, in most cases, the mechanical center axis of the torch does not coincide with its optical axis. To align nozzle position with the optical axis, an adjustment screw is used. This in turn may cause misalignment between nozzle center and mechanical center.

Since nozzle change position is designed to align with the mechanical center, the nozzle holder does not align with the nozzle center, making it impossible to change the nozzle.

SUMMARY OF THE INVENTION

In view of the above circumstances, the present invention has an object to provide a laser beam machine equipped with magazines for changing nozzles automatically and capable of accomplishing long, unattended operation.

A laser beam machine according to the present invention comprises, as basic means, a bed, a pallet which is disposed on the bed and holds a workpiece, a column which moves along an X axis, that is, in a longitudinal axis of the bed, a saddle which is supported by the column and moves along a Y axis orthogonal to the X axis, a machining head which is supported by the saddle and moves along a Z axis perpendicular to a plane formed by the X axis and Y axis, and a laser machining tool replaceably attached to the machining head. Further, it comprises the nozzle change magazine for laser machining tools, wherein the nozzle change magazine is disposed at an automatic tool change position.

The laser machining tool comprises a torch which has optical means including a condenser lens, and a nozzle which is replaceably attached to the tip of the torch.

The nozzle change magazine is placed on the plane formed by the X axis and the Y axis. Alternatively, it may be placed on a plane orthogonal to the plane formed by the X axis and the Y axis.

Nozzle change magazines are placed in a single row, in multiple rows, or in a matrix.

The nozzle change magazine comprises a nozzle stand for placing nozzles, and the nozzle stand comprises an elastic body held to a fixed portion on an outer periphery in such a way as to be slidable in a plane.

The torch comprises a joint to be attached to a tip, and a coupling for quick connect/disconnect of the nozzle.

The present invention allows long, unattended operation for various types of machining.

A floating mechanism allows nozzle changes even if the nozzle center is misaligned with the machine center.

Since the tool containing the nozzle is movable along linear axes (e.g., X, Y, and Z axes), there are few limits to installation locations of nozzle magazines.

The present invention makes it possible to put in and take out nozzles safely at any time as well as to carry out nozzle maintenance and nozzle changes, even during machining without opening a safety cover.

BRIEF DESCRIPTION OF THE DRAWINGS

FIG. 11 is a sectional view showing an attaching/detaching structure of a torch and nozzle;

FIG. 12–1 is an explanatory diagram illustrating a nozzle removal operation;

FIG. 12–2 is an explanatory diagram illustrating a nozzle removal operation;

FIG. 14–1 is an explanatory diagram illustrating a nozzle mounting operation;

FIG. 14–2 is an explanatory diagram illustrating a nozzle mounting operation;

DETAILED DESCRIPTION OF THE PREFERRED EMBODIMENTS

Figure 1:
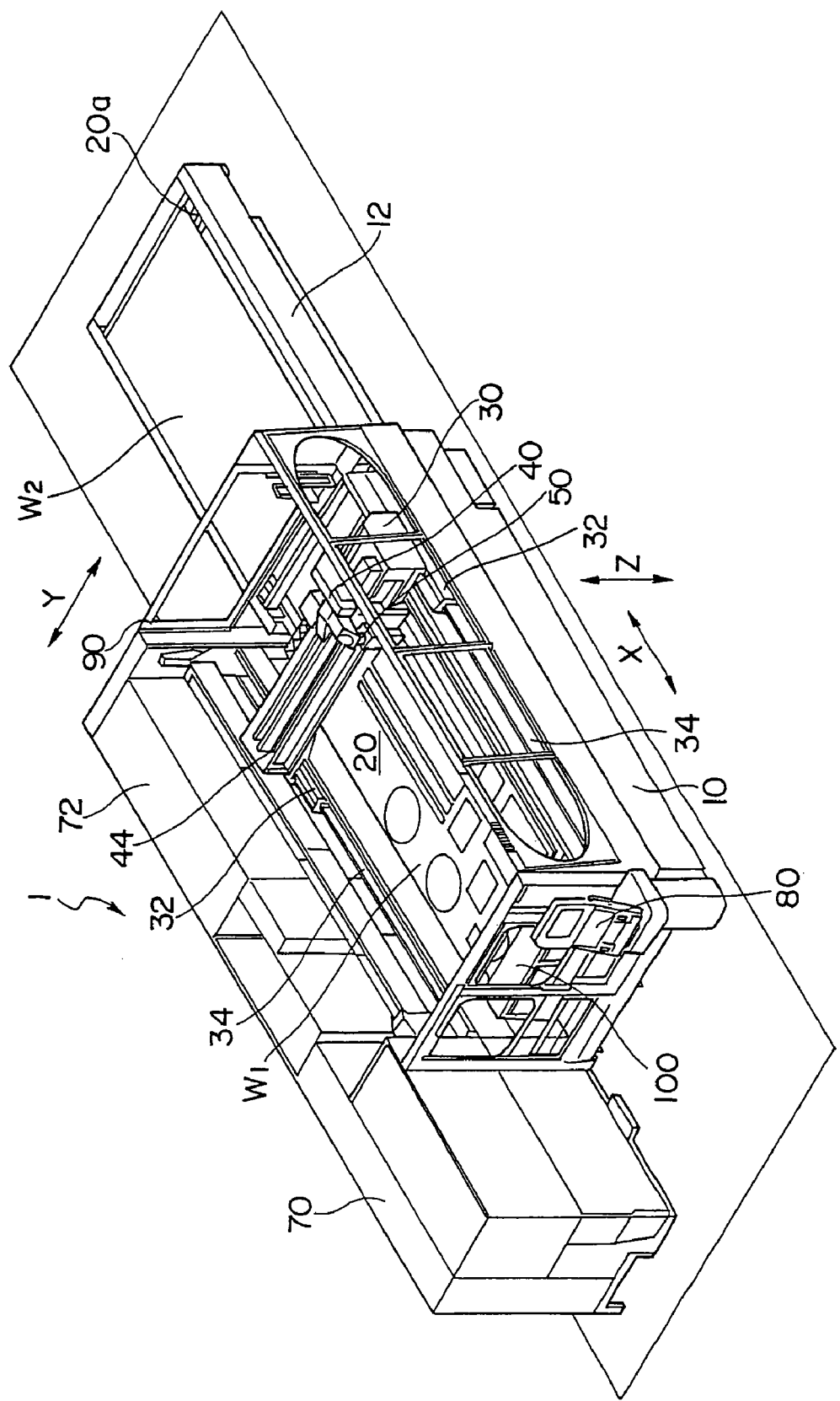
FIG. 1 is a perspective view showing an entire laser beam machine according to the present invention.
Figure 2:
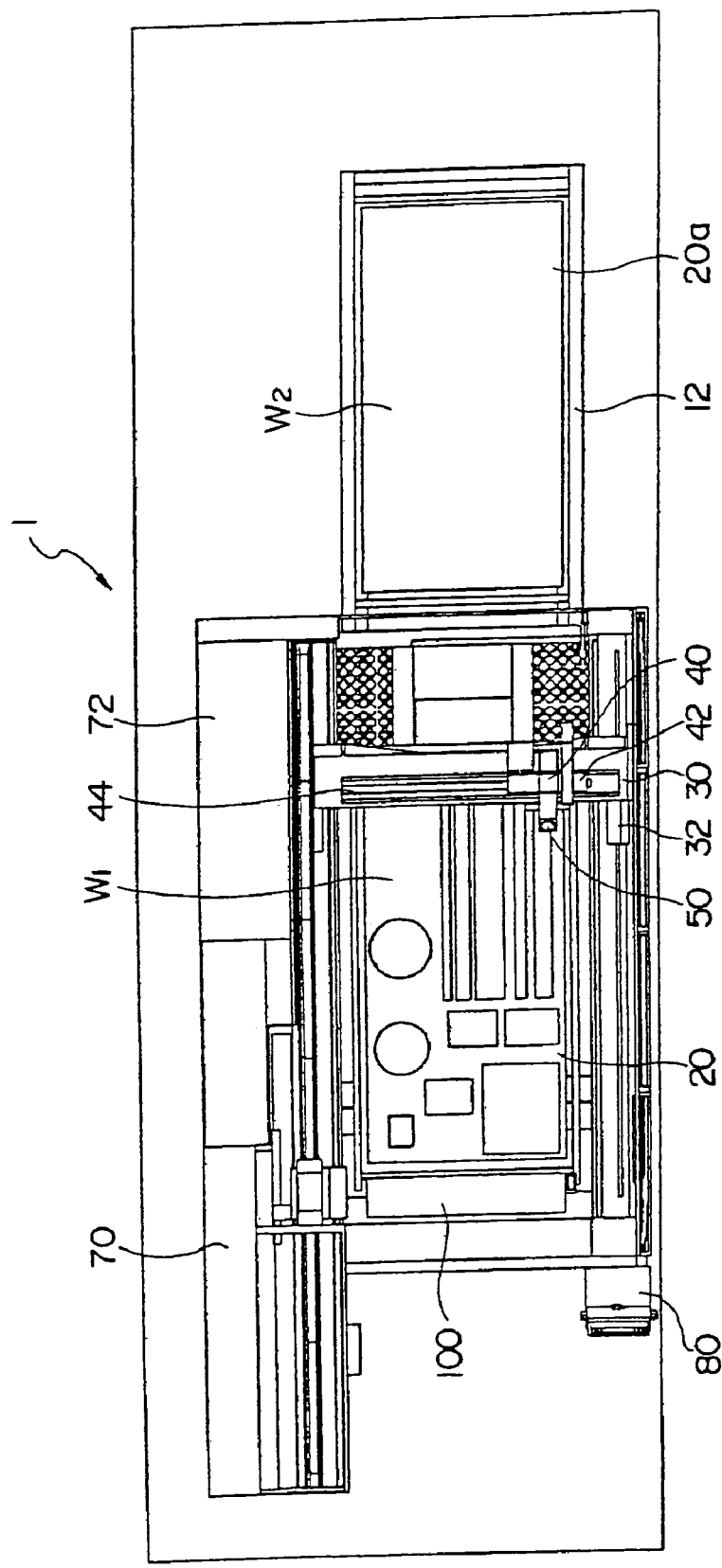
FIG. 2 is a plan view of the laser beam machine according to the present invention.
Figure 3:
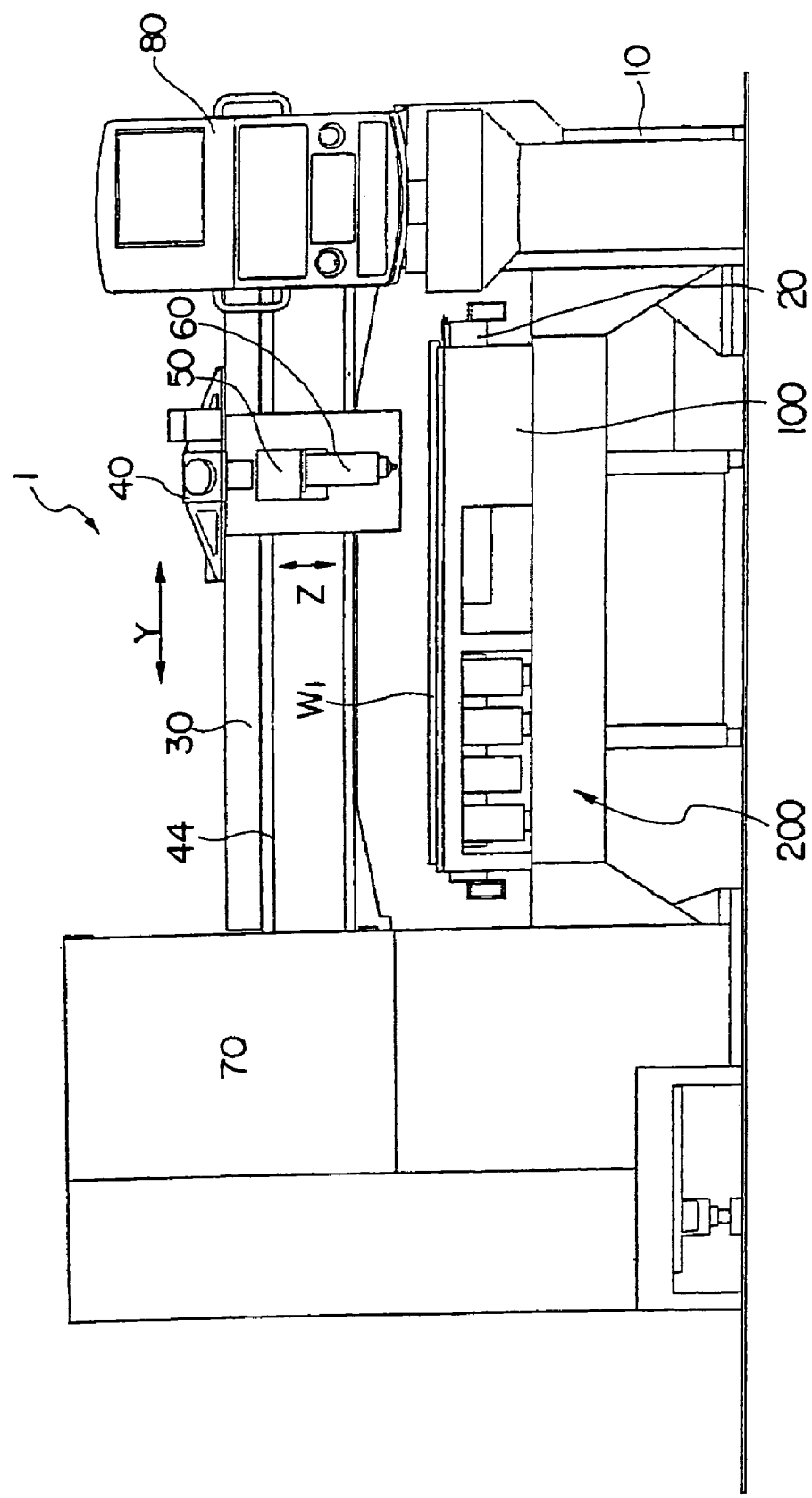
FIG. 3 is a front view of essential part of the laser beam machine according to the present invention.
Figure 4:
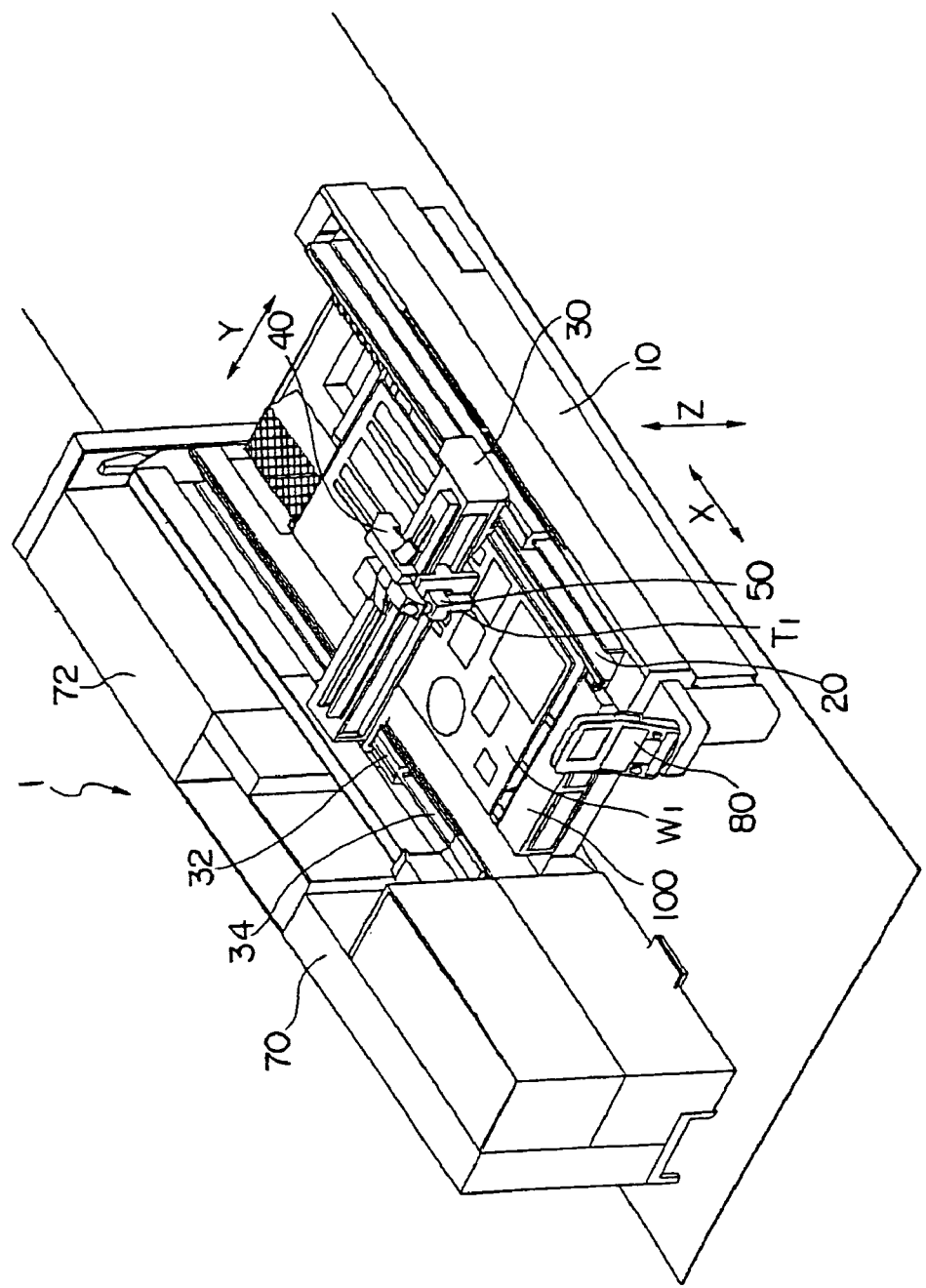
FIG. 4 is a perspective view of the essential part of the laser beam machine according to the present invention.
Figure 5:
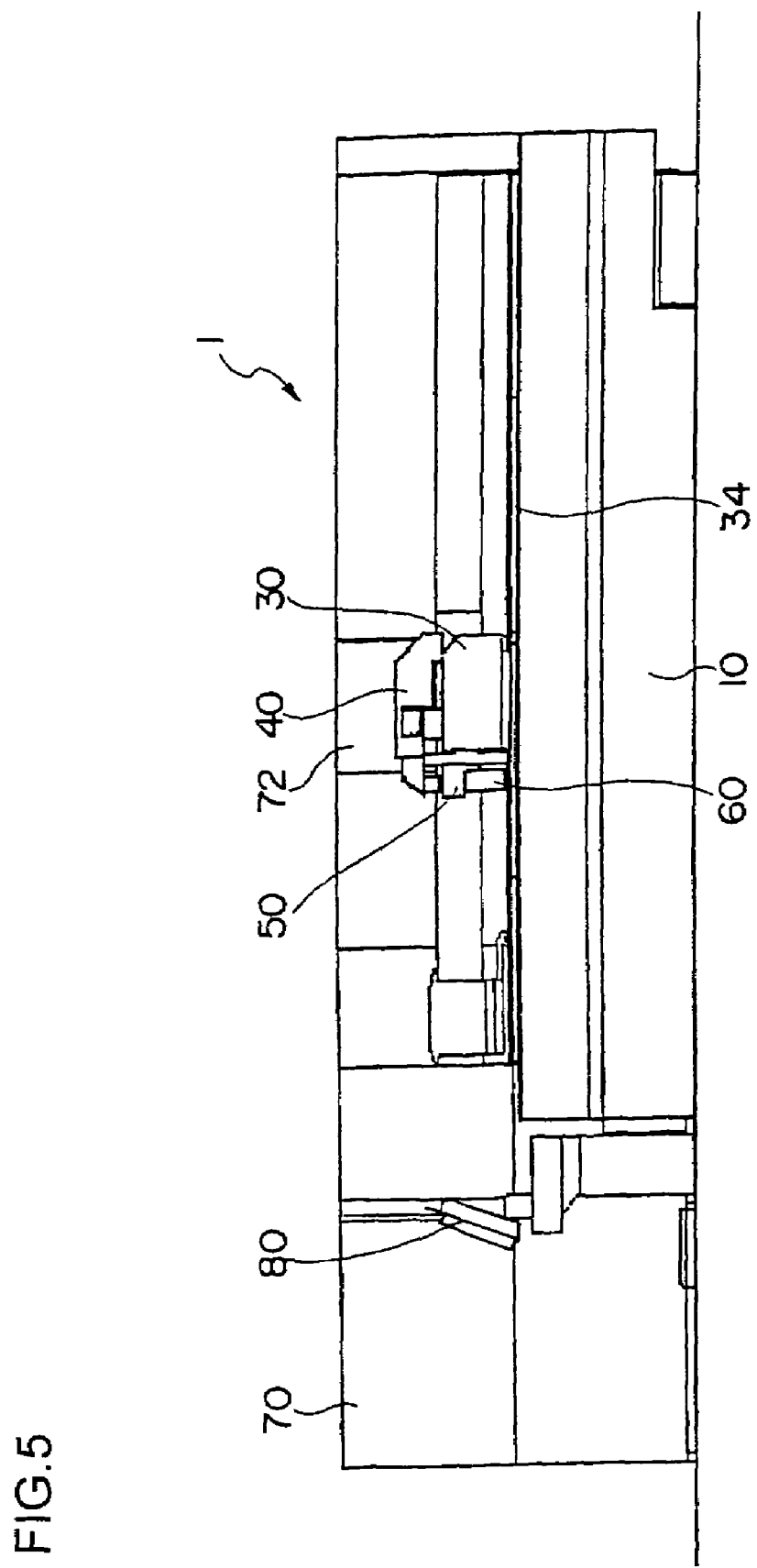
FIG. 5 is a side view of the essential part of the laser beam machine according to the present invention.

FIG. 1 is a perspective view showing an overall configuration of a laser beam machine according to the present invention, FIG. 2 is a plan view, FIG. 3 is a front view, FIG. 4 is a perspective view of the relevant portion, and FIG. 5 is a side view.

A laser beam machine, generally denoted by reference number 1, has a pallet (table) 20 which is disposed on a bed 10 to carry a plate-shaped workpiece $W_1$. A pallet changer 12 is placed on the longitudinal extension of the bed 10, and a pallet 20a carrying a workpiece $W_2$ to be machined next is awaiting its turn.

A pair of guide rails 34 are installed on both sides of the bed 10 along its length and a column 30 is mounted on the guide rails 34 in such a way as to be movable along an X axis.

Means for driving the column 30 along the X axis is provided by, for example, a linear motor, which is formed by a stator installed on the guide rails 34 and a moving member installed on a linear-motion guide 32.

A guide rail 44 is installed on the column 30 along a Y axis orthogonal to the X axis and a saddle 40 is mounted in such a way as to be movable along the Y axis. The saddle 40 is equipped with a linear-motion guide 42 which is engaged with the guide rail 44. A linear motor is formed by the guide rail 44 and linear-motion guide 42.

The saddle 40 has a guide rail installed along a Z axis perpendicular to the plane formed by the X axis and Y axis and has a machining head 50 mounted in such a way as to be movable along the Z axis. The machining head 50 has an optical system which admits a laser beam from a laser oscillator 72.

The machining head 50 is equipped replaceably with a laser machining tool 60. A machining area is fitted with a cover 90 to ensure safety. A power panel 70 and the laser oscillator 72 are disposed adjacent to the bed 10. A control panel 80 for use by the operator to give various commands is disposed on a longitudinal end of the bed 10. A setup station 100 for laser machining tools is installed on that end of the bed 10 which is closer to the control panel 80.

Figure 6:
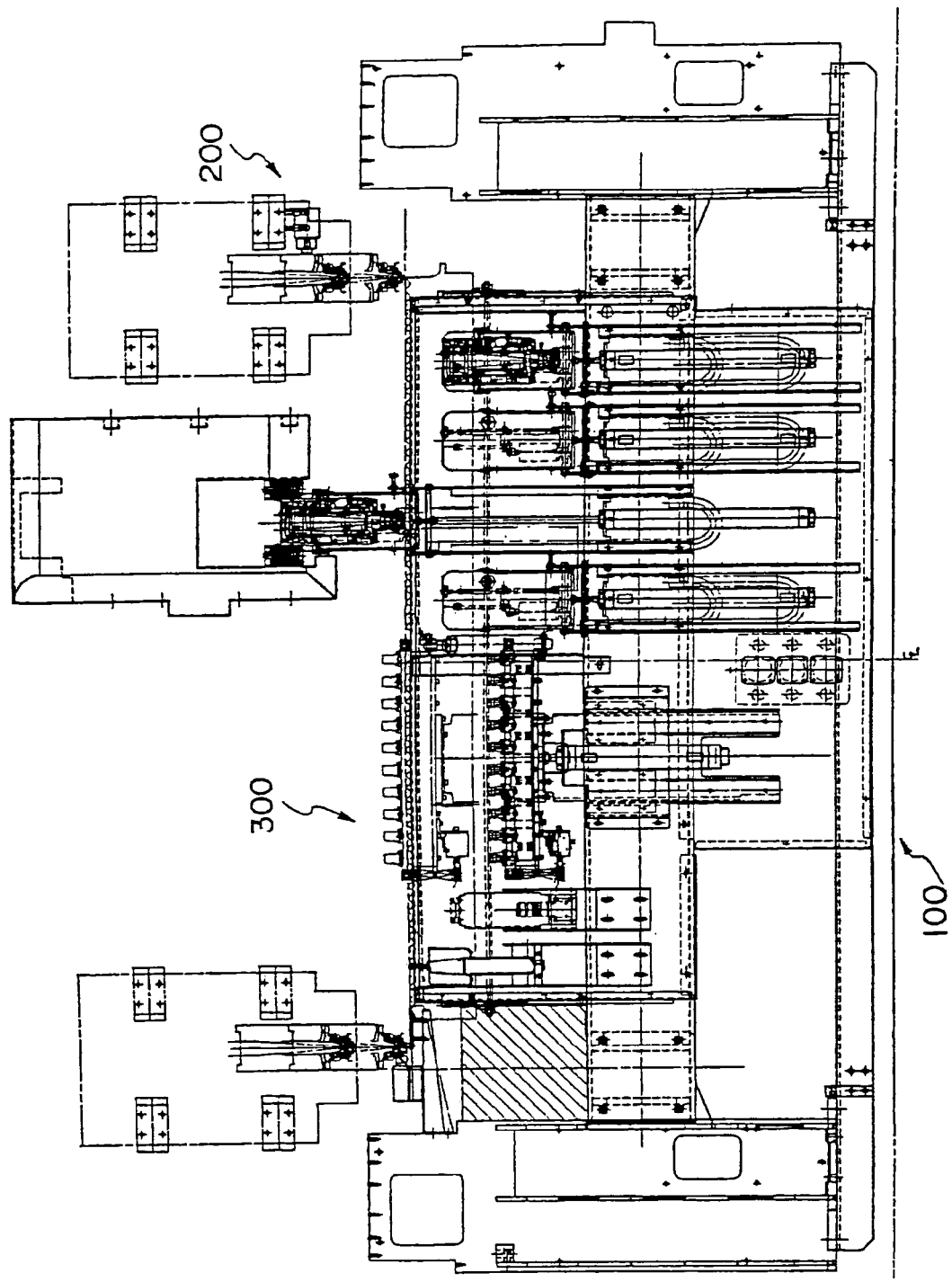
FIG. 6 is a front view of a setup station for laser machining tools.
Figure 7:
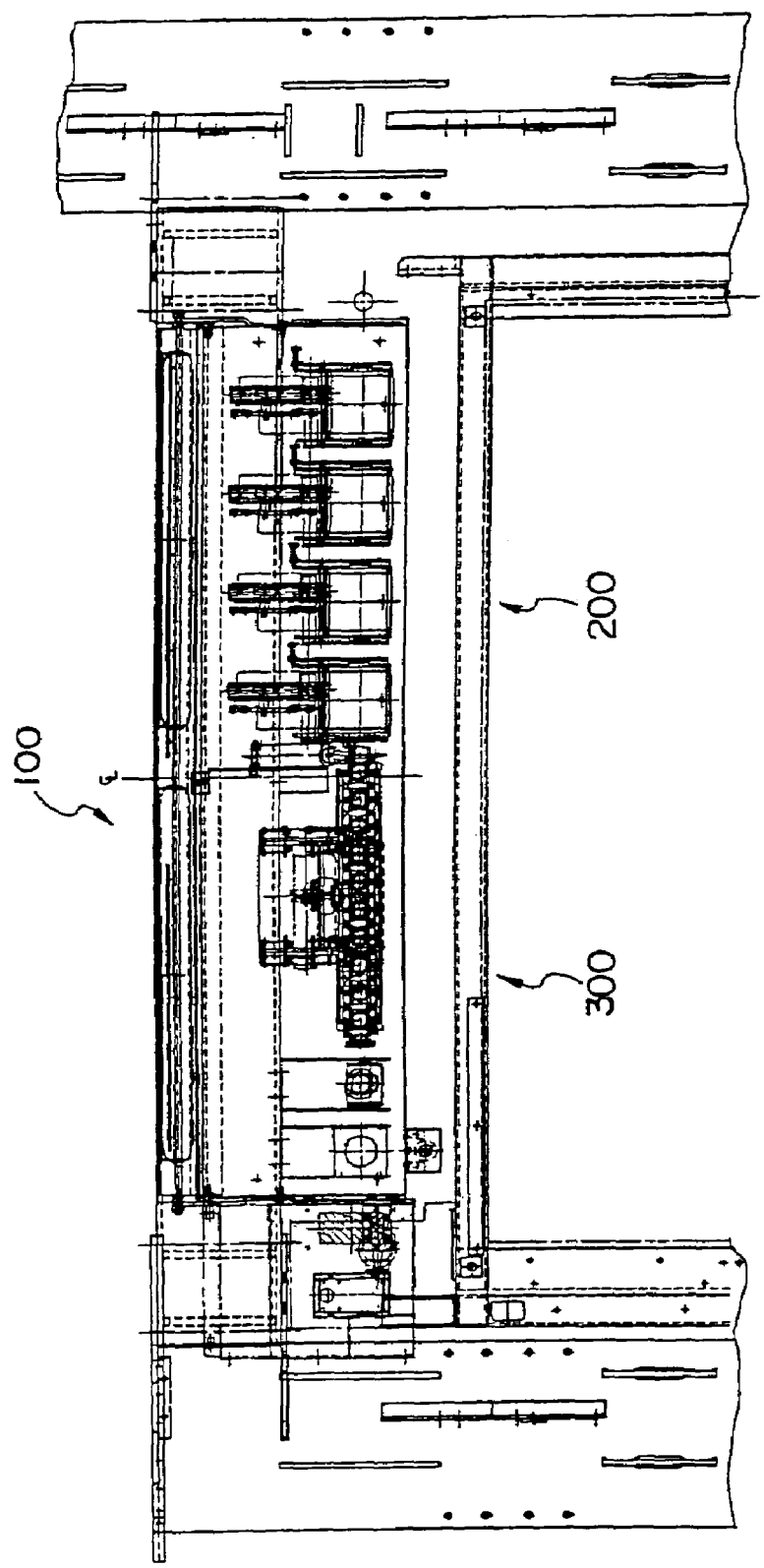
FIG. 7 is a plan view of the setup station for laser machining tools.

FIG. 6 is a front view of the setup station 100 for laser machining tools as viewed from the table and FIG. 7 is a plan view.

The setup station 100 for laser machining tools includes a tool station 200 and nozzle station 300, where the tool station 200 is equipped with a tool change magazine for laser machining tools which in turn are equipped with a torch and nozzle while the nozzle station 300 is equipped with a nozzle change magazine for nozzles of laser machining tools.

Figure 8:
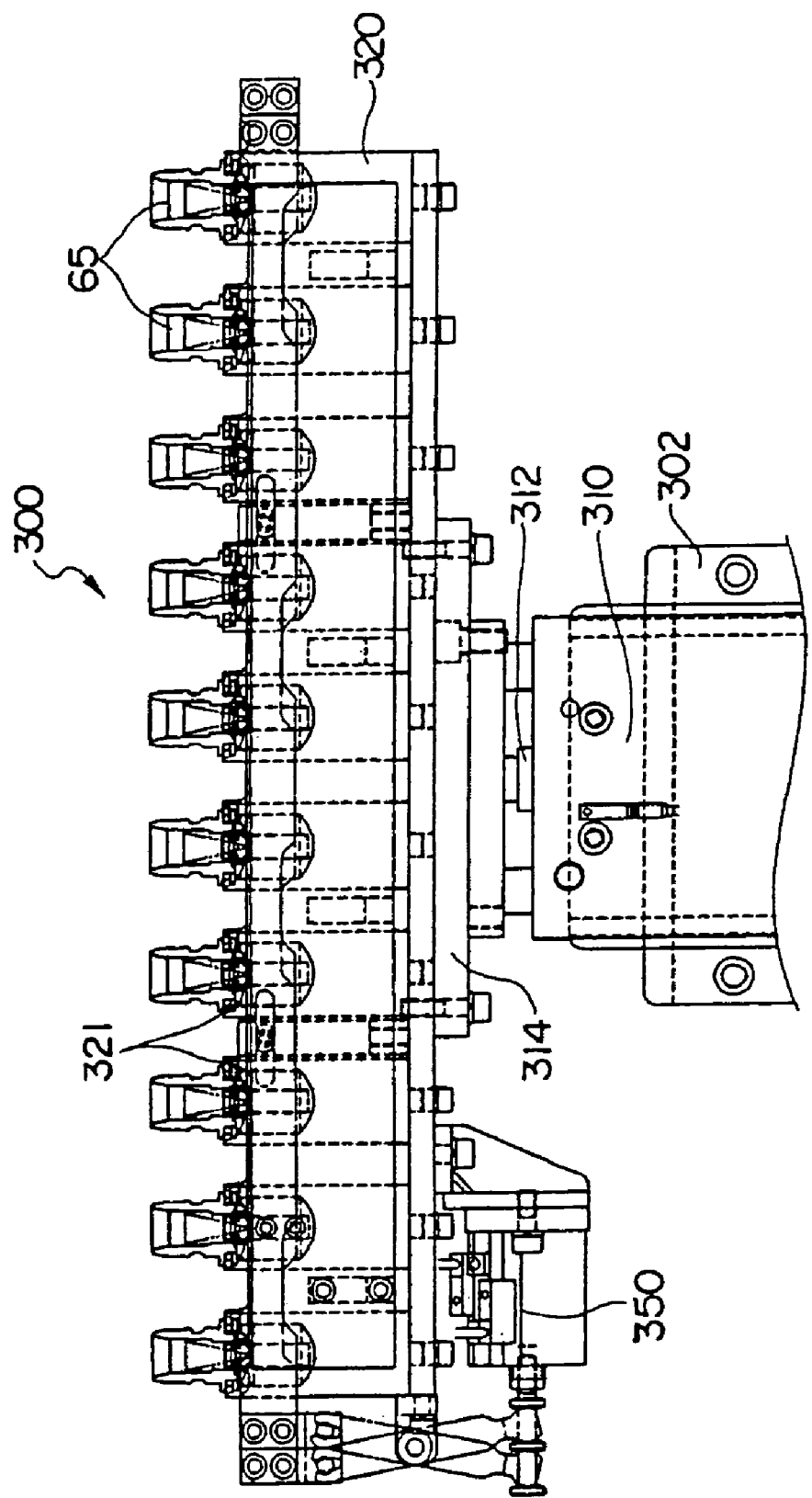
FIG. 8 is a front view of a nozzle station.
Figure 9:
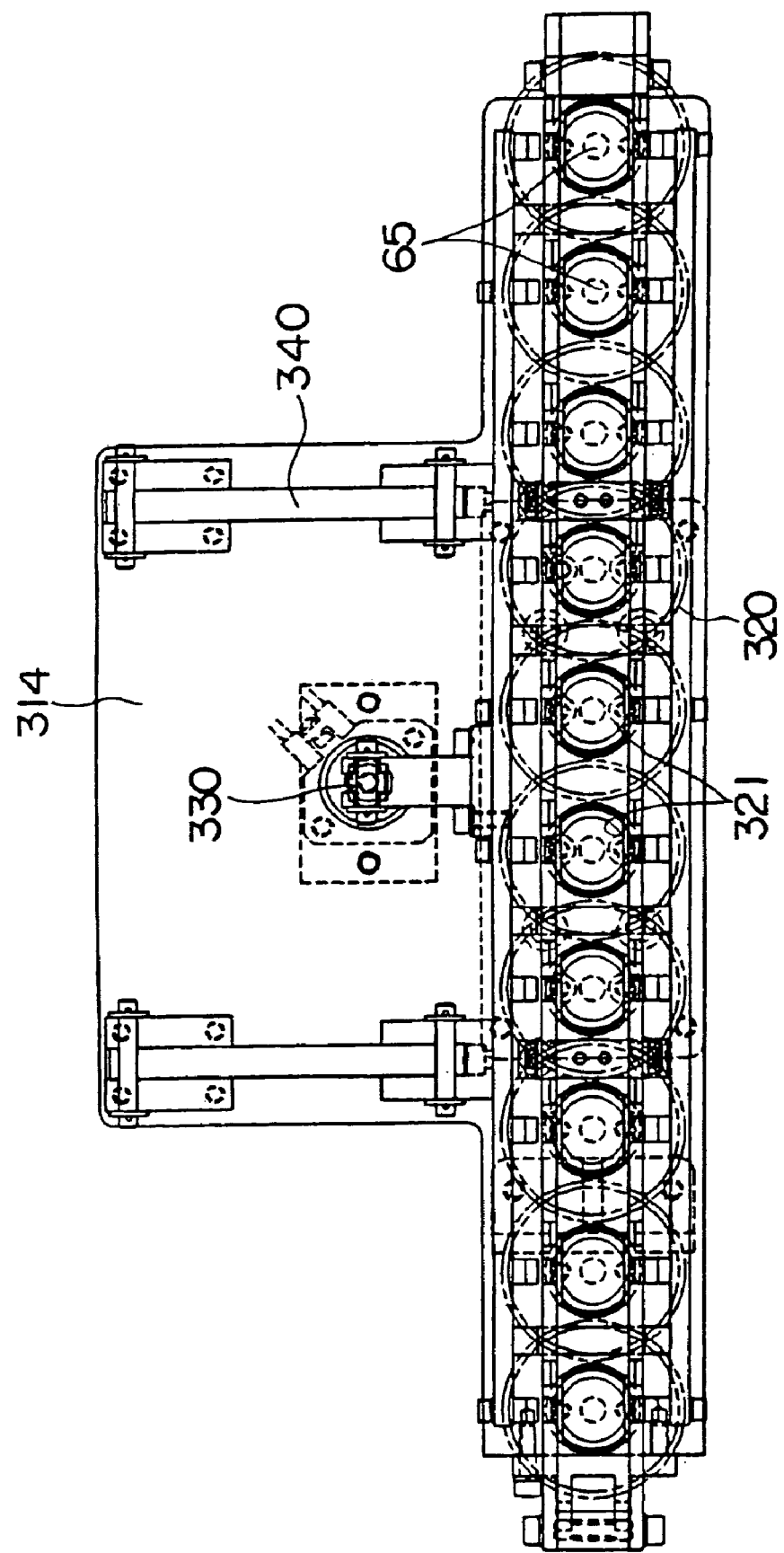
FIG. 9 is a plan view of the nozzle station.
Figure 10:
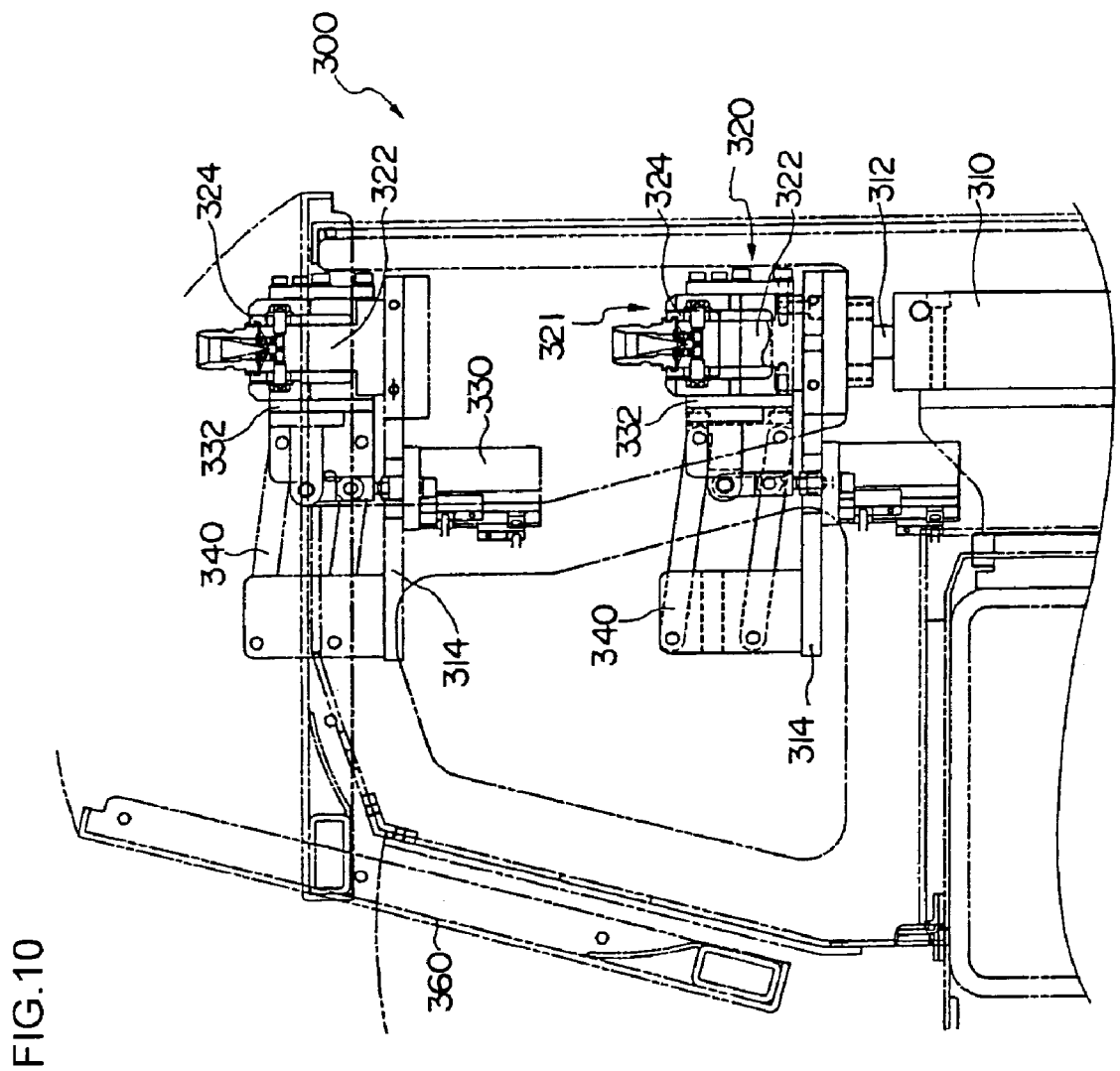
FIG. 10 is a detailed view of the nozzle station.

FIG. 8 is a front view, FIG. 9 is a plan view, and FIG. 10 is a left side view of the nozzle station.

The nozzle station generally denoted by document number 300, comprises a cylinder 310 installed on a base 302, magazine base 314 raised and lowered by a piston rod 312, and a magazine 320 installed on the base 314.

The magazine 320 is equipped with a plurality of stockers 321, each of which contains replacement nozzles 65.

As shown in FIG. 10, the nozzle station 300 has a cover 360 which covers its top. The cover 360 is opened only during nozzle changes and is always closed when the nozzle station 300 is in a waiting state.

The magazine base 314 is raised to nozzle change position by operation of the cylinder 310. The cover 360 is opened.

Each nozzle stocker 321 has a stand 322 on which nozzles are placed and an openable/closable hook 324 which grips the nozzles.

Pins 332 which move up and down are disposed outside the hook 324. The pins 332 move up and down by the action of a cylinder 330 mounted on the base 314. When the pins 332 move up and down, parallelism of the movement is ensured by a parallel link 340.

FIG. 11 is a sectional view illustrating an attaching/detaching structure of a torch 61 and the nozzle 65 of a laser machining tool.

FIG. 11(a) shows the torch 61 of the laser machining tool with the nozzle 65 attached while FIG. 11(b) shows the torch 61 of the laser machining tool with the nozzle 65 removed.

A joint 62 is attached to the tip of the torch 61. The joint 62 has a coupler 622, balls 621 which are supported in the coupler 622 in such a way as to be movable in and out of the coupler 622, and a spring 623 which bias the coupler 622.

The nozzle 65 has a groove 652 formed on the outer side of its cylindrical body 651 to accept the balls 621.

When the nozzle 65 is attached to the joint 62 of the torch, the balls 621 of the coupler 622 fit in the groove 652 of the nozzle 65 to support the nozzle 65.

As the pins 332 installed at the nozzle station push up a socket 620 against the spring 623, the balls 321 are pulled into the coupler 622, allowing the nozzle 65 to be pulled out of the torch 61 of the joint 62 with a single motion.

The nozzle stand 322 is held to a fixed member around it by springs 323 in such a way as to be slidable in a plane as indicated by arrows.

Consequently, even if the axis of the nozzle 65 placed on the nozzle stand 322 is misaligned with the axis of the torch 61, it is possible to attach and detach the nozzle 65 by absorbing the misalignment.

FIGS. 12–1 and 12–2 are explanatory diagrams illustrating how a nozzle is removed and returned to the nozzle station.

FIG. 12–1(a) shows a nozzle magazine waiting at the nozzle station with the hook 324 opened to right and left.

In FIG. 12–1(b), the laser machining head is lowered along the Z axis, the nozzle 65 at the tip of the laser machining tool is set on the nozzle stand 322, and the hook 324 is closed.

In FIG. 12–1(c), the pins 332 are raised to push up the socket 620 in the joint 62 of the torch 61 against the spring 623. Consequently, the balls 621 in the coupler 622 unclamp the torch.

In FIG. 12–2(d), the machining head is raised along the Z axis with the nozzle unclamped.

FIG. 12–2(e) shows the nozzle 65 removed and returned to the stand 322. The pins 332 are lowered to complete the nozzle return operation.

Figure 13:
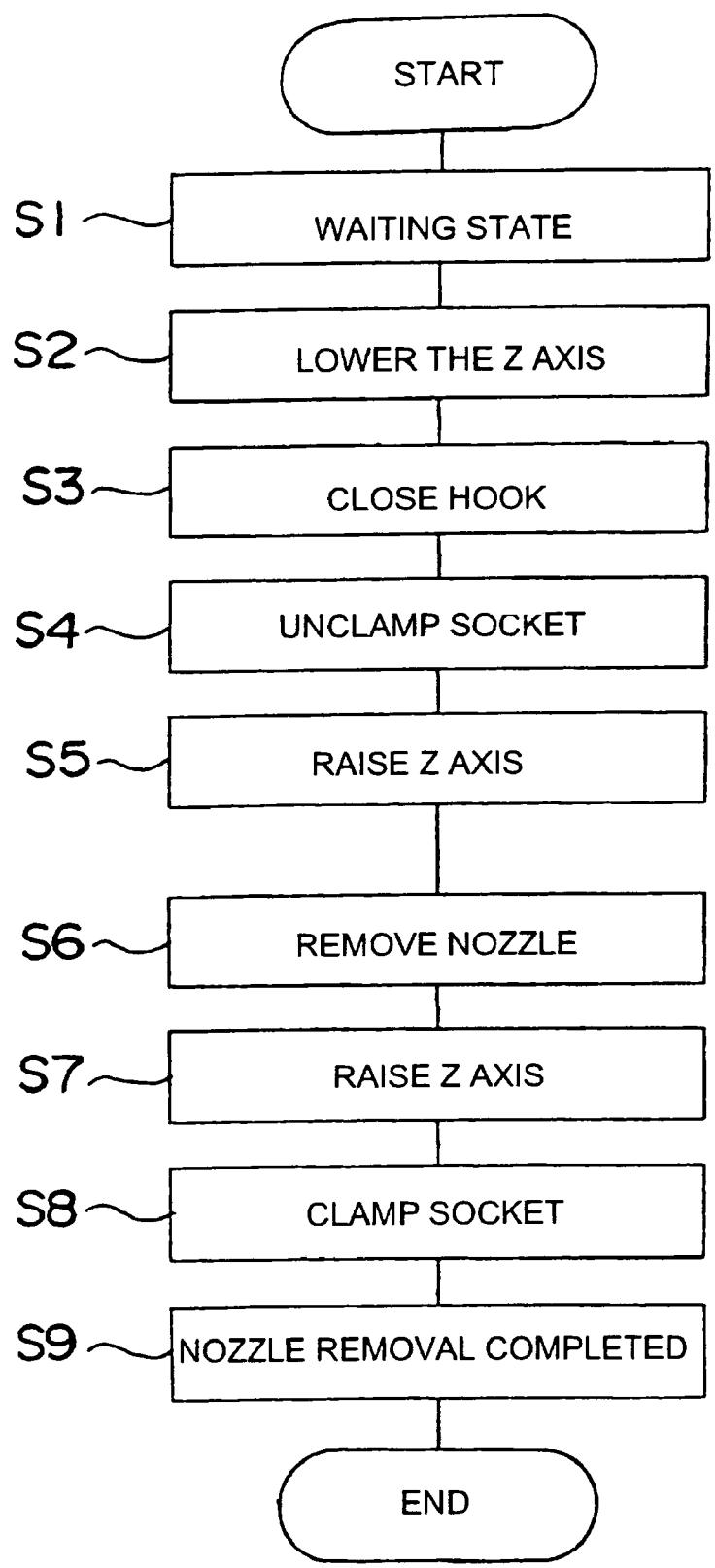
FIG. 13 is a flowchart showing a nozzle been removed.

FIG. 13 is a flowchart showing the operations described above in FIG. 12.

FIGS. 14–1 and 14–2 are explanatory diagrams illustrating how a nozzle provided at the nozzle station is mounted on the torch of the laser machining tool.

FIG. 14–1(a) shows a waiting state in which the nozzle 65 is placed on the stand 322.

In FIG. 14–1(b), the machining head is lowered along the Z axis, the pins 332 are raised, and the coupler in the joint 62 at the tip of the torch 61 is opened.

In FIG. 14–1(c), the laser machining head is further lowered to insert the nozzle 65 in the joint 62.

In FIG. 14–2(d), the pins 332 are lowered to clamp the nozzle 65 in the joint 62 and the hook 324 is opened.

In FIG. 14–2(e), the machining head is raised along the Z axis and the hook 324 is closed to complete the nozzle mounting operation.

Figure 15:
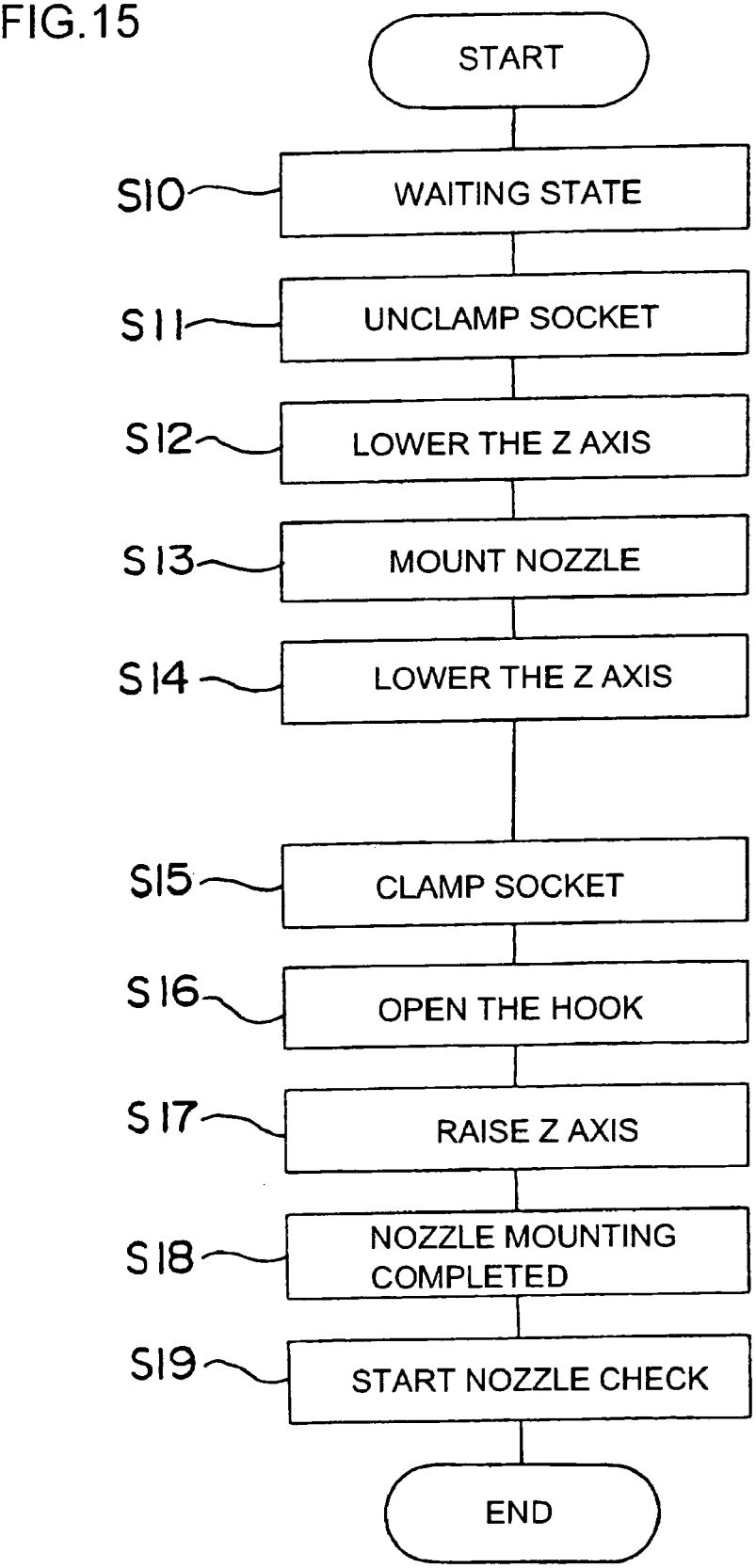
FIG. 15 is a flowchart showing a nozzle mounted.

FIG. 15 is a flowchart showing the operations described with document to FIG. 14.

In the example described above, the nozzle change magazine is placed at an end of the bed.

A nozzle change magazine with another appropriate configuration may be placed at another desired location.

Figure 16:
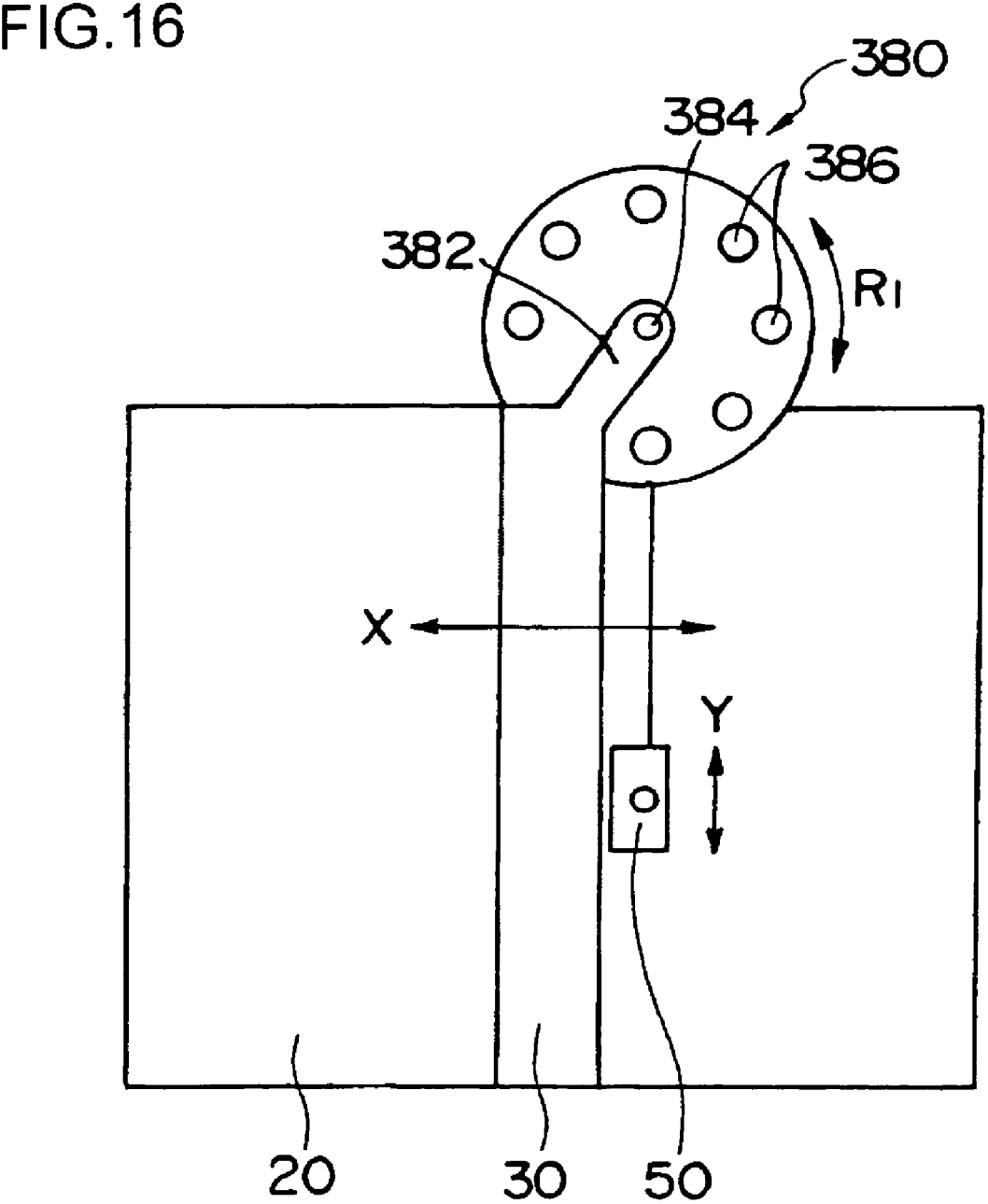
FIG. 16 is an explanatory diagram illustrating another example of a nozzle change magazine.

FIG. 16 is an explanatory diagram illustrating another configuration example of a nozzle change magazine.

A nozzle change magazine 380 is rotatably supported at an end of a transverse member 30 by a shaft 384. The magazine 380 has a plurality of stands 386 disposed on the circumference and automatically changes the nozzle mounted in the machining head 50 using the same mechanism as the above described example.

This configuration allows the nozzle to be changed by simply moving the machining head along the Y axis, making it possible to reduce tool change time.

In addition to the above examples, nozzle change magazines may be arranged in a plane or in multiple tiers.

Further, although a linear motor has been cited in the above example as a driving means along the X and Y axes, the present invention can also be applied using a ball screw.

Furthermore, although in the above example, the joint at the tip of the torch has balls which are supported in the coupler unit in such a way as to be movable in and out of the coupler, the present invention can alternatively be applied using rollers.

What is claimed is:

1. A nozzle change magazine for a laser beam machine that comprises a bed, a pallet which is disposed on the bed and holds a workpiece, a column which moves along an X axis, that is, in a longitudinal axis of the bed, a saddle which is supported by the column and moves along a Y axis orthogonal to the X axis, a machining head which is supported by the saddle and moves along a Z axis perpendicular to a plane formed by the X axis and Y axis, and a laser machining tool replaceably attached to the machining head, wherein the laser beam machine comprises the nozzle change magazine for laser machining tools, and a dust-proof cover which covers top of the nozzle change magazine for laser machining tools and opens only when a nozzle of the laser machining tool is changed.

2. The nozzle change magazine for a laser beam machine according to claim 1, wherein the laser machining tool comprises a torch which has optical means including a condenser lens, and a nozzle which is replaceably attached to the tip of the torch.

3. The nozzle change magazine for a laser beam machine according to claim 2, wherein the torch comprises a joint to be attached to a tip; and a coupling for quick connect/disconnect of the nozzle.

4. The nozzle change magazine for a laser beam machine according to claim 1, wherein the nozzle change magazine is placed on the plane formed by the X axis and the Y axis.

5. The nozzle change magazine for a laser beam machine according to claim 4, wherein the nozzle change magazines are placed in a single row, in muttiple rows, or in a matrix.

6. The nozzle change magazine for a laser beam machine according to claim 1, comprising a nozzle stand for placing nozzles, wherein the nozzle stand comprises an elastic body held to a fixed portion on an outer periphery in such a way as to be slidable in a plane.

7. The nozzle change magazine for a laser beam machine according to claim 1, wherein the nozzle change magazine is placed on a plane orthogonal to the plane formed by the X axis and the Y axis.

8. The nozzle change magazine for a laser beam machine according to claim 7, wherein the nozzle change magazines are placed in a single row, in multiple rows, or in a matrix.

* * * * *